United States Patent
Hosaka

(10) Patent No.: US 6,246,024 B1
(45) Date of Patent: Jun. 12, 2001

(54) WIRE ELECTRIC DISCHARGE MACHINING APPARATUS

(75) Inventor: Akio Hosaka, Fukui (JP)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 09/414,599

(22) Filed: Oct. 8, 1999

(30) Foreign Application Priority Data

Oct. 12, 1998 (JP) .................................................. 10-303218

(51) Int. Cl.[7] .............................. B23H 1/00; B23H 7/10
(52) U.S. Cl. .......................................................... 219/69.12
(58) Field of Search ............................. 219/69.11, 69.12, 219/69.14

(56) References Cited

U.S. PATENT DOCUMENTS

| 4,608,143 | 8/1986 | Inoue | 204/224 M |
|---|---|---|---|
| 4,808,787 | * 2/1989 | Futamura | 219/69.12 |
| 5,070,224 | * 12/1991 | Töpter et al. | 219/69.12 |
| 5,086,203 | * 2/1992 | Kobayashi et al. | 219/69.12 |
| 5,111,016 | * 5/1992 | Lodetti et al. | 219/69.12 |
| 5,171,955 | * 12/1992 | Hosaka et al. | 219/69.12 |
| 5,243,165 | * 9/1993 | Hosaka | 219/69.12 |
| 5,897,791 | 4/1999 | Hayakawa | 219/69.12 |

FOREIGN PATENT DOCUMENTS

| 0 707 917 A1 | 4/1996 | (EP) . |
|---|---|---|
| 0 779 124 A1 | 6/1997 | (EP) . |

* cited by examiner

Primary Examiner—Geoffrey S. Evans
(74) Attorney, Agent, or Firm—McDermott, Will & Emery; Paul Devinsky

(57) ABSTRACT

A wire cut electric discharge machining apparatus for machining a workpiece using a wire electrode traveling vertically between upper and lower wire guide devices includes a work tank in which the lower wire guide device and the workpiece are disposed, a lower wire guide drive unit disposed outside the work tank for driving the lower wire guide device horizontally in a direction of a first axis, a connecting shaft for connecting the lower wire guide device and the lower wire guide drive unit, a guide rail extending from the outside to the inside of the work tank in the direction of the first axis and being movable relative to the work tank in the direction of a second axis perpendicular to the first axis, and a support provided on the first guide rail for movably supporting the lower wire guide device.

13 Claims, 8 Drawing Sheets

WIRE ELECTRIC DISCHARGE MACHINING APPARATUS

FIELD OF THE INVENTION

The present invention relates to a wire electric discharge machining apparatus for machining a workpiece by generating electric discharges between the workpiece and a wire electrode traveling vertically between a pair of wire guide devices, while moving the workpiece relative to the traveling wire electrode. More particularly, the present invention relates to a wire electric discharge machining apparatus having an arm for supporting a lower wire guide device passing through the wall of a work tank.

BACKGROUND OF THE INVENTION

Generally, a lower wire guide device positioned inside a work tank of a wire electric discharge machine is supported at the end of a horizontally extending arm. The arm is fixed to a side surface of a column, for example, at a base end of the arm, and passes through an elongated hole formed in one of the work tank walls. An opening of the elongated hole normally extends in the X-axis direction and the arm extends in the Y-axis direction so that the work tank can move within the X-Y plane relative to the arm. The elongated hole is sealed in a fluid tight manner by a slide plate having a hole through which the arm passes. If the arm is long, there are large variations in the position of the lower wire guide device due to bending in a direction perpendicular to the arm.

U.S. Pat. No. 5,897,791 discloses a wire electric discharge machine having a mechanism for driving a lower wire guide device positioned inside a work tank within the X-Y plane. With this type of wire electric discharge machine, there is no need for an arm for attaching the lower wire guide mechanism, which obviously means that there is no need to seal an arm. A unit including a servo motor, ball screw, guide rail, position sensor, etc. is positioned inside a work tank filled with dielectric fluid, so they are covered in a fluid-tight manner by bellows. However, this unit is heavier than the conventional arm, making it necessary for a mechanism supporting the unit to be sufficiently large. Great care must be taken with respect to protecting the drive mechanism from invasion by dielectric fluid.

SUMMARY OF THE INVENTION

An object of the present invention is to provide a wire electric discharge machine in which a lower wire guide device is positioned as close as possible to a guide mechanism for the lower wire guide device, to ensure accurate positioning of the lower wire guide device.

Another object of the present invention is to provide a wire electric discharge machine that does not require protection against dielectric fluid invasion for the drive mechanism of a lower wire guide device.

Additional objects advantages and novel features of the invention will be set forth in the description that follows and will become apparent to those skilled in the art upon reading His description or practicing the invention. The objects and advantages of the invention may be realized and attained by practicing the invention as recited in the appended claims.

In order to achieve the above objects and other, a wire electric discharge machining apparatus of the present invention for machining a workpiece using a wire electrode traveling vertically between upper and lower wire guide devices may comprise:

a work tank in which the lower wire guide device and the workpiece are disposed, a lower wire guide drive unit disposed outside the work tank for driving the lower wire guide device horizontally in a direction of a first axis, a connecting shaft connecting the lower wire guide device and the lower wire guide drive unit, a first guide rail, extending from the outside to the inside of the work tank in the direction of the first axis and movable relative to the work tank in the direction of a second axis perpendicular to the first axis, and a moveable support, moveable along the first guide rail, for supporting the lower wire guide.

It is preferable that the moveable support includes a pair of linear motion bearing rails provided on the upper surface of the first guide rail extending in the direction of the second axis, and a pair of linear motion bearings that engage the pair of linear motion bearing rails for movably supporting the lower wire guide device.

It is preferable that the wire electric discharge machining apparatus comprises second guide rail extending in the direction of the second axis, a linear motion bearing rail provided on an upper surface of the second guide rail, and a linear motion bearing engaging the linear motion bearing rail for supporting a tip end of the first guide rail.

BRIEF DESCRIPTION OF THE DRAWINGS

The accompanying drawings, which are incorporated in and form a part of the specification, illustrate an embodiment of the present invention, and together with the description serve to explain the principles of the invention.

PREFERRED EMBODIMENT OF THE INVENTION

Figure 1:
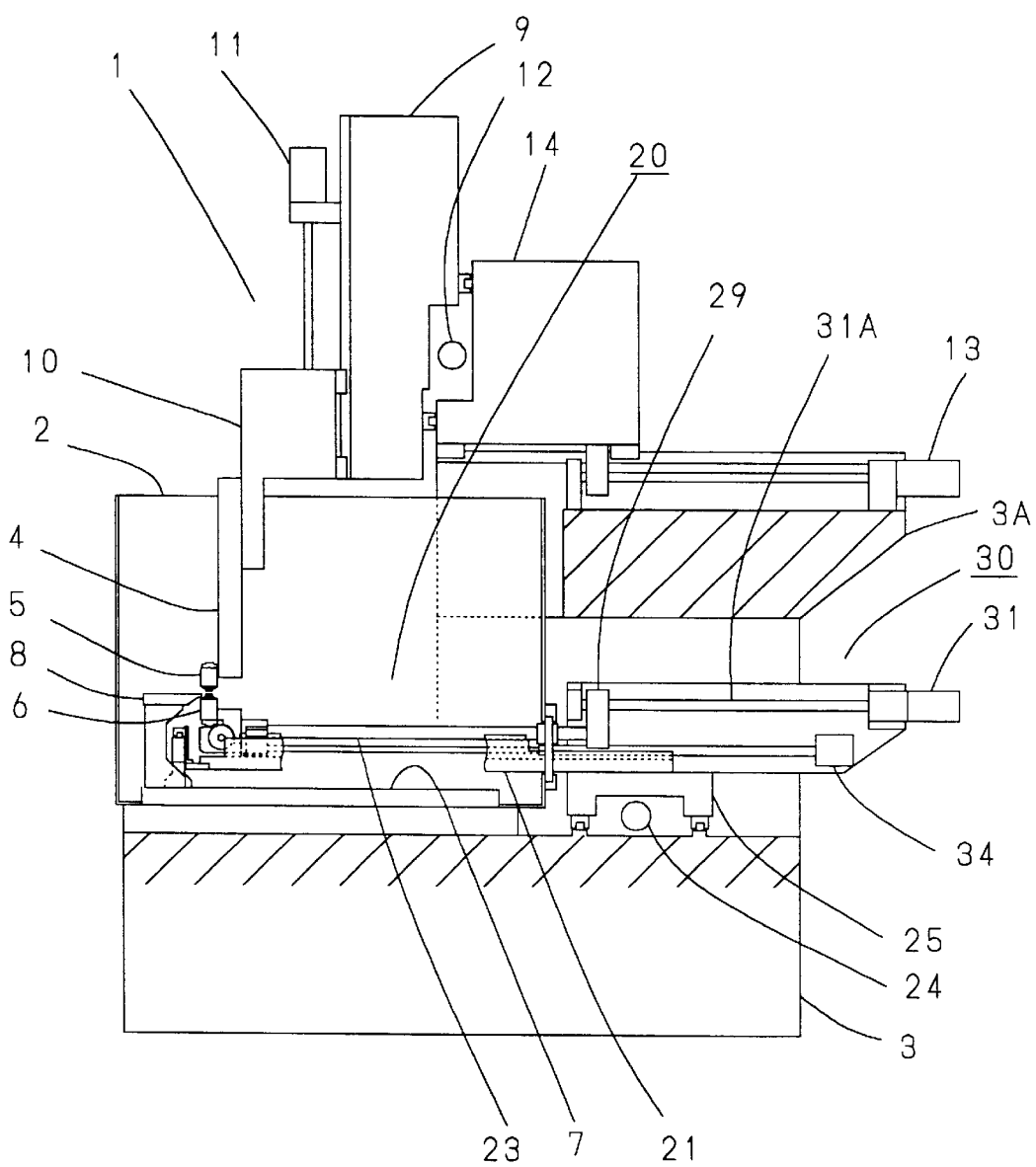
FIG. 1 is a side elevation illustrating a wire electric discharge machine according to a first embodiment of the present invention.
Figure 2:
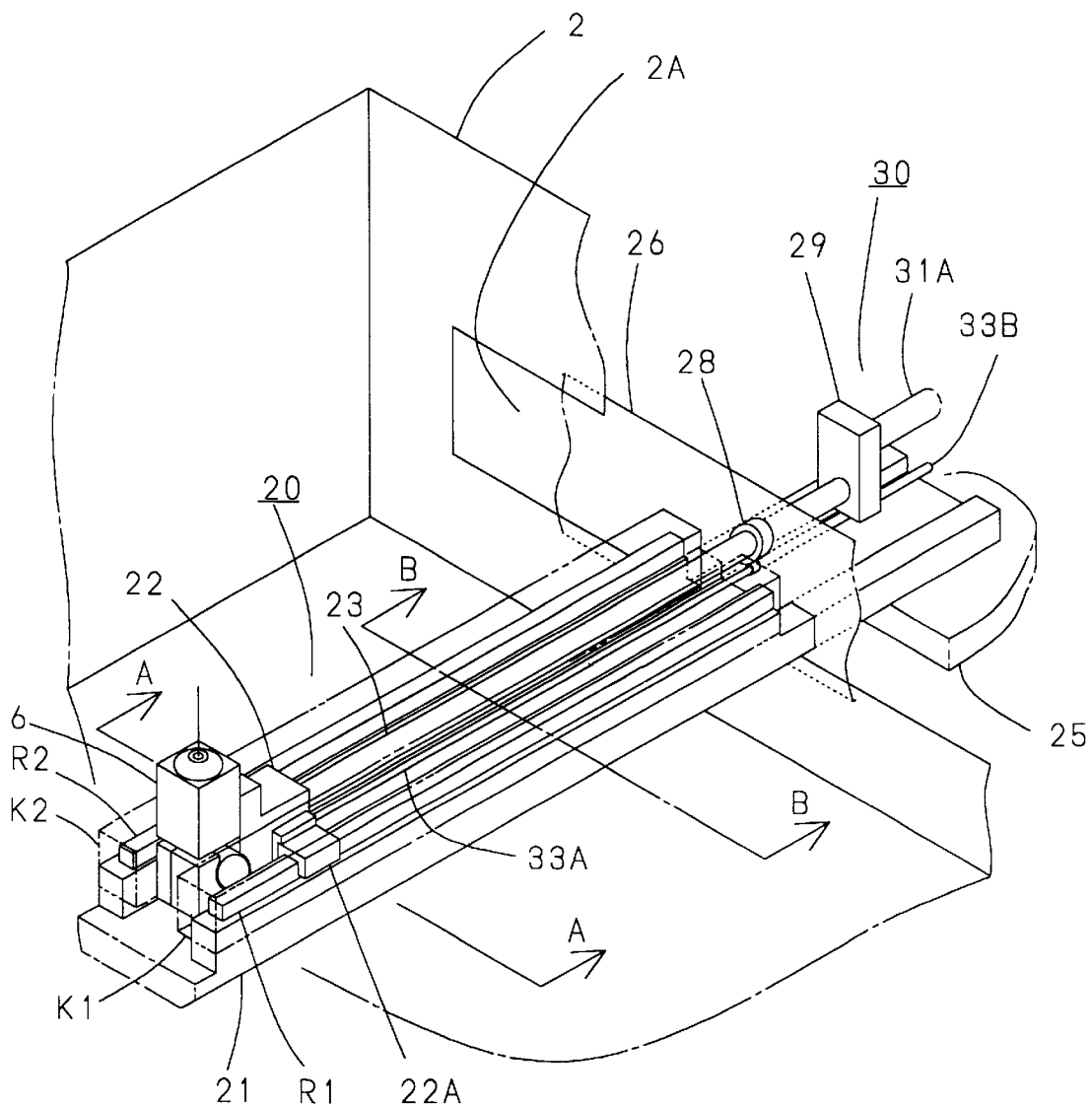
FIG. 2 is a perspective illustrating the lower arm assembly of FIG. 1.

A wire electric discharge machine according to a first embodiment of the present invention will now be described with reference to FIG. 1.

The wire electric discharge machine 1 comprises a work tank 2 fixed to a bed 3, and a column 3A having an opening in a lower section fixed to the bed 3. A workstand 8, to which a workpiece is fastened, stands on a table 7 provided in the work tank 2. An upper wire guide device 5 and a lower wire guide device 6 are respectively held by an upper arm 4 and a lower arm assembly 20. The upper and lower wire guide devices 5 and 6 respectively include power feed contacts for supplying power to the moving wire electrode, and wire guides for determining the position of the wire electrode. The lower arm assembly 20 includes a guide rail 21 extending in the direction of Y1-axis, and a connecting shaft 23 extending parallel to the guide rail 21. A base end of the guide rail 21 is attached to a flat top face of a saddle 25, which is provided on the bed 3 so as to be movable in the direction of the X1-axis by a motor 24. One end of the connecting shaft 23 is fixed to the lower wire guide device 6, while the other end is fixed to a connecting member 29. The connecting member 29 threadingly engages a ball screw 31A which extends in the direction of Y1-axis and rotates by a motor 31. In this way, the lower wire guide device 6 can be moved in the direction of X1-axis and Y1-axis by motors 24 and 31. A lower wire guide drive unit 30 comprising the ball screw 31A and the motor 31 is fixed to the saddle 25, and the lower wire guide drive unit 30 and the saddle 25 are housed in an opening section of the column 3A. A head 10, to which the upper arm 4 is fixed, is attached to a front surface of a saddle 9 so as to be movable in the direction of the Z-axis by a motor 11. A wire electrode supply device (not shown) is provided on a head 10. The wire electrode itself (not shown) is transported from the wire electrode supply device to a wire ejecting device 34 via the upper and lower wire guide devices 5 and 6 and the lower arm assembly 20. The saddle 9 is attached to a ram 14 so as to be movable in the direction of the X2-axis by the motor 12. The ram 14 is mounted on a column 3A so as to be movable in the direction of Y2-axis by a motor 13. In this way, the upper wire guide device 5 can be moved in the direction of the Z-, X2- and Y2-axes by the motors 11, 12 and 13.

The X1-Y1 plane formed by orthogonal X1-axis and Y1-axis, and the X2-Y2 plane formed by orthogonal X2-axis and Y2-axis, are parallel with each other, and these two planes are at right angles to the Z-axis. An NC device supplies control signals to the motors 24 and 31 to move the lower wire guide device 6 in the X1-Y1 plane, and supplies control signals to the motors 12 and 13 to move the upper wire guide device 5 in the X2-Y2 plane. When making a straight cut (normal straight-line machining) movement in the X1-Y1 plane and movement in the X2-Y2 plane are controlled simultaneously so that the wire electrode cutting through the workpiece maintains perpendicularity. When making a taper cut (taper cut machining), movement in the plane X1-Y1 and movement in the plane X2-Y2 are controlled simultaneously so that the position of the upper wire guide device 5 may be offset from the position of the lower wire guide device 6. The upper wire guide device S can be moved in the X2-Y2 plane independently of movement of the lower wire guide device 6 in the plane X1 - Y1, which means that the wire electric discharge machine 1 is capable of large angled taper cuts.

Next the lower arm assembly 20 will be described with reference to FIG. 2 to FIG. 6.

Figure 3:
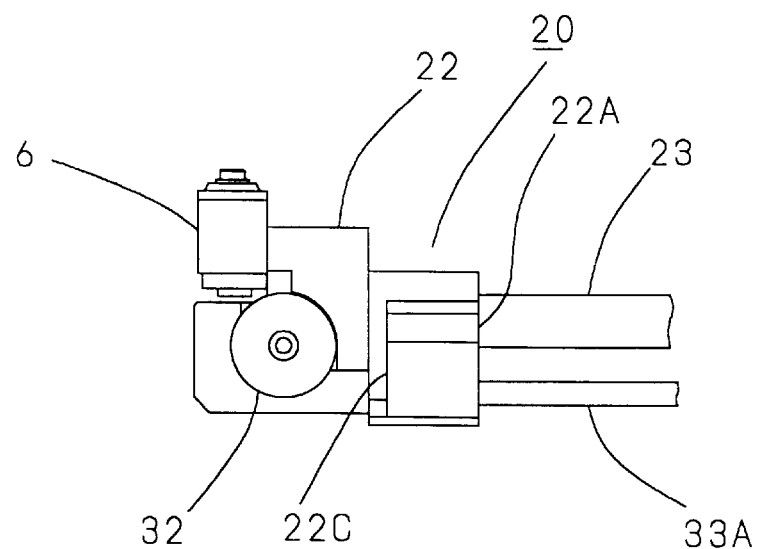
FIG. 3 is a side elevation illustrating a part of the lower arm assembly of FIG. 1 for supporting the lower wire guide device.
Figure 4:
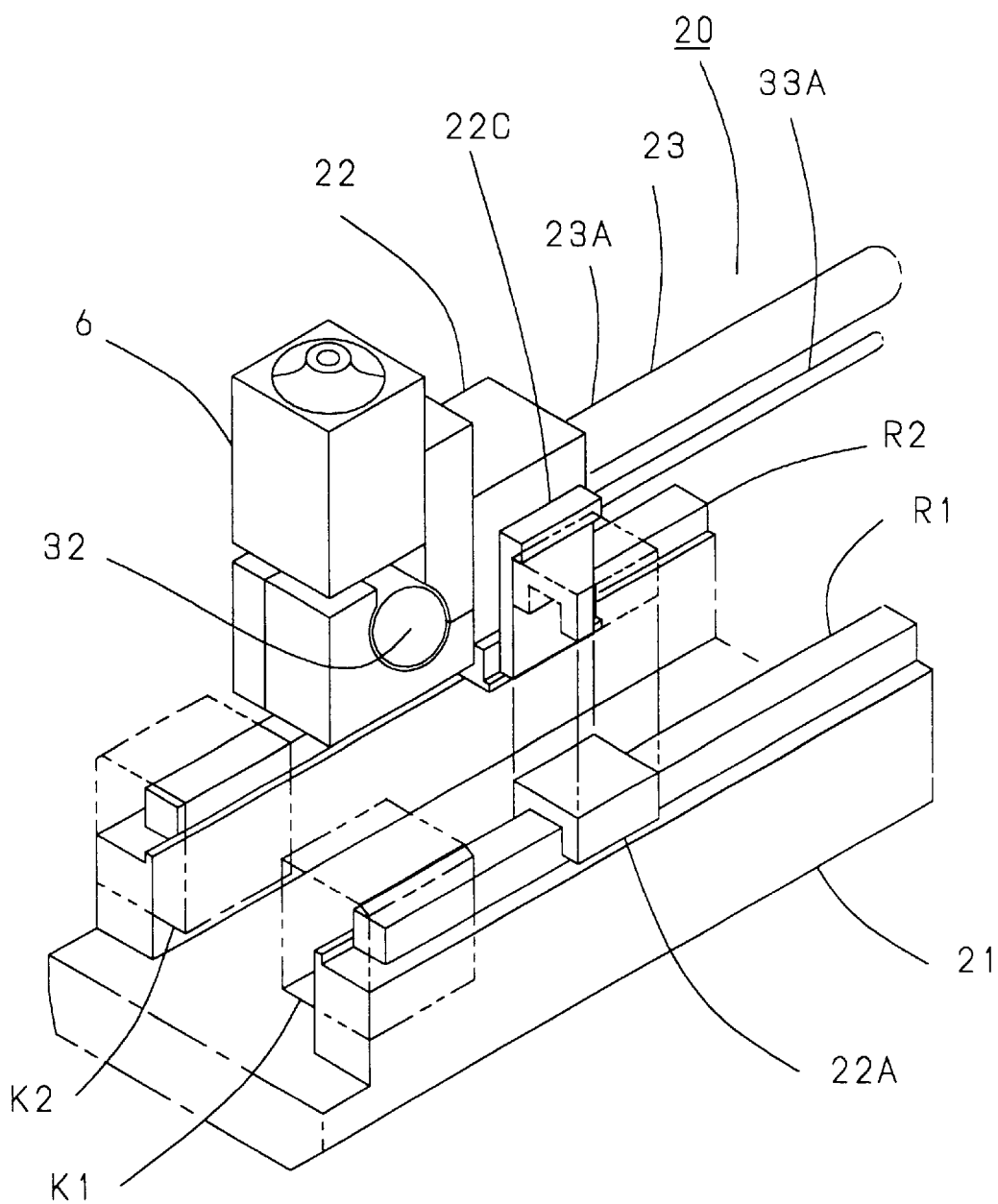
FIG. 4 is a partially disassembled perspective view illustrating the part of the lower arm assembly of FIG. 1 for supporting the lower wire guide device.
Figure 5:
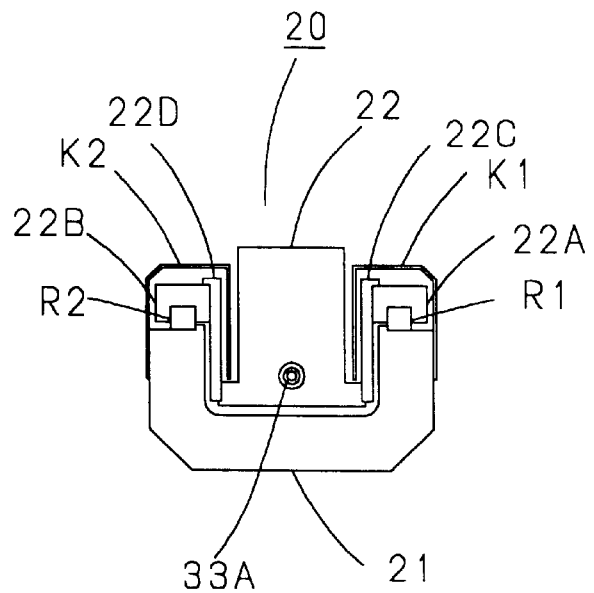
FIG. 5 is a cross sectional view along line A—A in FIG. 2, illustrating the lower arm assembly of FIG. 1.
Figure 6:
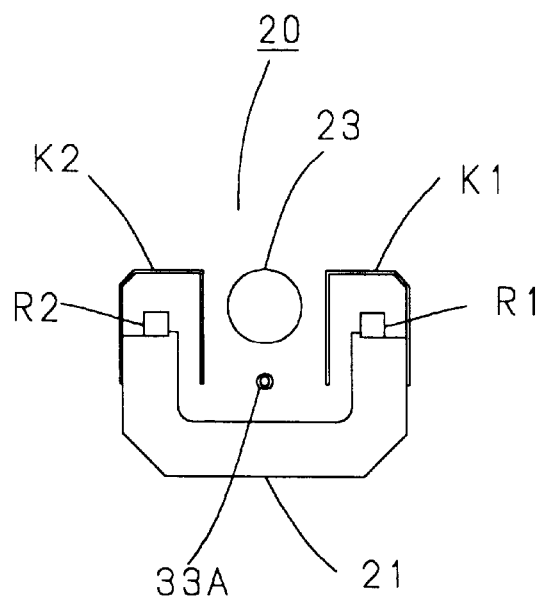
FIG. 6 is a cross sectional view along line B—B in FIG. 2, illustrating the lower arm assembly of FIG. 1.

As is clearly shown in FIG. 3 and FIG. 4, the wire electrode (not shown) fed from the lower wire guide device 6 is fed around a variable direction roller 32, through a pipe 33A extending parallel to the connecting shaft 23, and outside the work tank 2. The lower arm assembly 20 comprises the connecting shaft 23, the guide rail 21, and linear motion bearings 22A and 22B (FIG. 5) for movably supporting the lower wire guide device 6. The lower wire guide device 6 is connected to one end of the connecting shaft 23 using a connecting block 22. The connecting block 22, through which a pipe 33A passes, is guided by the guide rail 21 so that it can move in the direction of the Y1-axis. As clearly shown in FIG. 5 and FIG. 6, the guide rail 21 has a U-shaped cross section in order to give it high rigidity. A pair of linear motion bearing rails R1 and R2 are provided on the upper surface of the guide rail 21, extending in the direction of the Y1-axis. The pair of linear motion bearings 22A and 22B engage the linear motion bearing rails R1 and R2. The connecting block 22 is suspended from the linear motion bearings 22A and 22B by connecting members 22C and 22D. Thus, the lower wire guide device 6 is supported by the linear motion bearings 22A and 22B, and guided by the guide rail 21. As clearly shown in FIG. 5 and FIG. 6, the connecting block 22, the connecting shaft 23 and the pipe 33A are housed inside the U-shaped recess of the guide rail 21, which means that cross section of the lower arm assembly 20 is small. Covers K1 and K2 shown by imaginary lines in FIG. 2 and FIG. 4 protect the linear motion bearing rails R1 and R2 and the linear motion bearings 22A and 22B from dielectric fluid, and both ends of the covers K1 and K2 in the direction of Y1-axis are sealed. As clearly shown in FIG. 5 and FIG. 6, the covers K1 and K2 have an inverted U-shaped cross section. In a submerged wire electric discharge machine in which the work tank can be filled with dielectric fluid, it is preferable to supply pressurized air from a pressure pump (not shown) to the inside of the covers K1 and K2, to reliably prevent the incursion of dielectric fluid.

Figure 7:
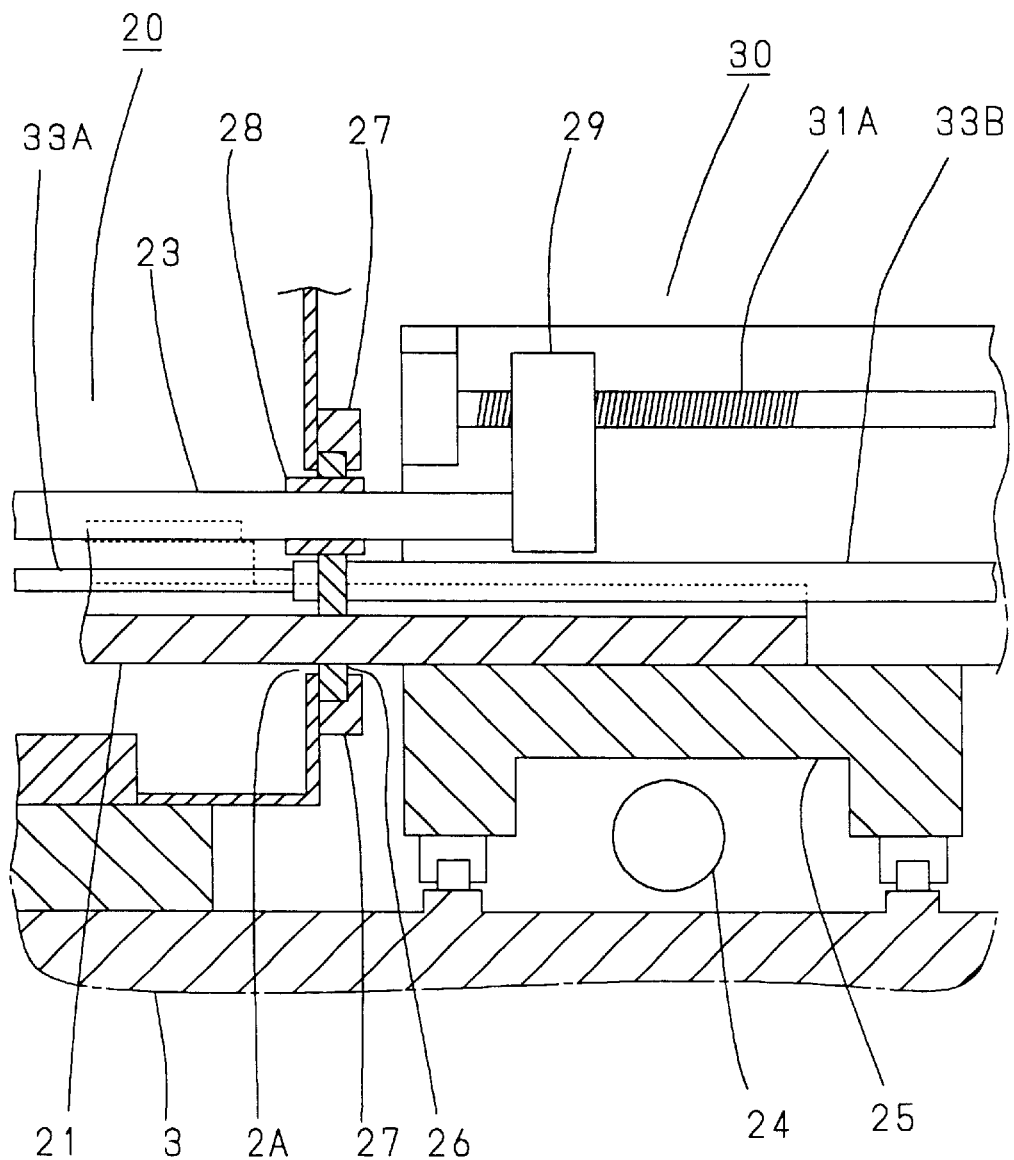
FIG. 7 is a side elevation illustrating a base end section of the lower arm assembly of FIG. 1.

As is best shown in FIG. 7, the guide rail 21 penetrates through the elongated hole 2A of the work tank 2, and a base end of the guide rail 21 is fastened at its bottom surface to a flat top surface of the saddle 25. A slide plate 26 blocks off the elongated hole 2A has holes through which the guide rail 21, connecting shaft 23 and pipe 33B respectively pass, and is secured to the guide rail 21. The connecting shaft 23, fixed at one end to the connecting block 22, extends to the outside of the work tank 2 through a shaft sealing member 28 provided in the slide plate 26, and is fixed at its other end to the connecting member 29. The pipe 33A fixed to the connecting block 22 can be telescopically housed inside the pipe 33B. The pipe 33B is fixed to the slide plate 26 and the wire ejecting device 34 (FIG. 1). When the guide rail 21 is moved in the direction of X1-axis, the slide plate 26 slides on the wall of the work tank 2 while maintaining a fluid-tight condition by a press member 27. In a non-submerged wire electric discharge machine, in which dielectric fluid is flushed to a processing area without filling in the work tank, it is possible to use a bellows in place of the slide plate 26.

In this way, the highly rigid guide rail 21 is firmly fastened to the saddle 25. Accordingly, even if the sliding resistance of the slide plate 26 that moves in the direction of the X1-axis is large, there is only miniscule deformation of the guide rail 21 in the direction of the X1-axis. Further, the linear motion bearings 22A and 22B for supporting the lower wire guide device 6 are guided in the vicinity of the lower wire guide device 6 by the guide rail 21. This means that the lower wire guide device 6 is reliably positioned in the X1-Y1 plane. In addition, since the drive mechanism including the motors 24 and 31 and the ball screws is located outside the work tank 2, there is no incursion of dielectric fluid into the drive unit. The drive unit also has excellent maintainability and electrical safety.

Figure 8:
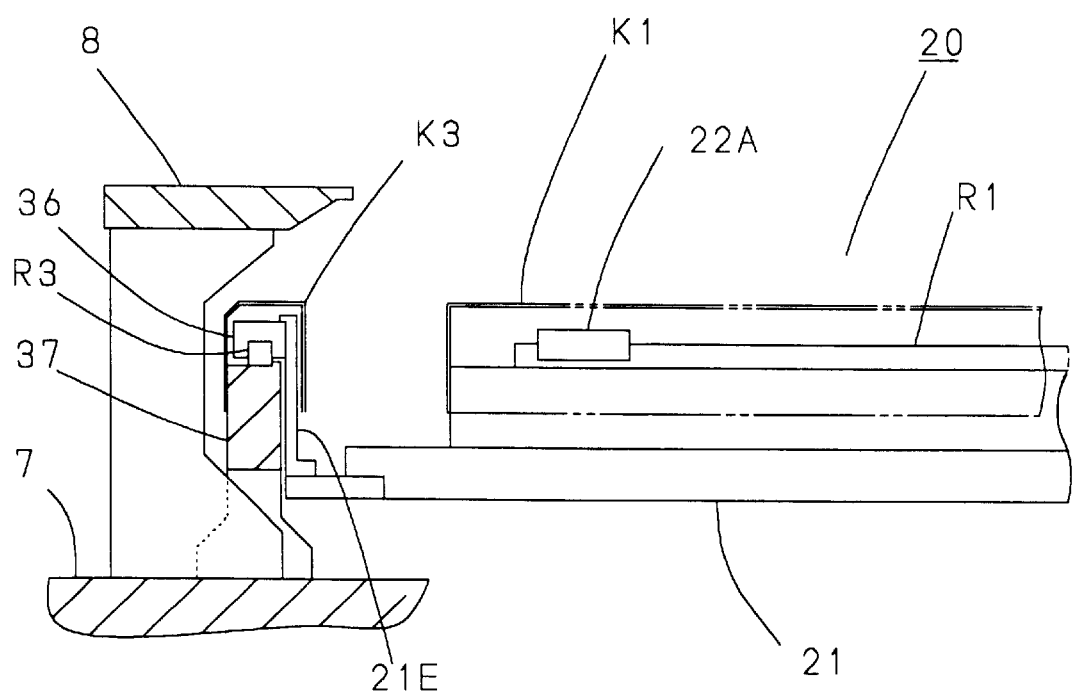
FIG. 8 is a side elevation illustrating a tip end section of the lower arm assembly of FIG. 1.

As shown in FIG. 8, in order to prevent downward play of the guide rail 21, a linear motion bearing 36 having low frictional resistance is connected to a tip end of the guide rail 21 via the connecting member 21E. The linear motion bearing 36 engages a linear motion bearing rail R3 provided on an upper surface of a guide rail 37 which extends in the direction of X1-axis. In this way, the linear motion bearing rail R3 guides the tip end of the guide rail 21 by means of the linear motion bearing 36. As a result, the guide rail 21 can be moved stably in the direction of X1-axis without vibration. The lower wire guide device 6 is supported at both ends. Therefore, even if, for example, the lower wire guide device 6 were to make a long movement in the direction of Y1-axis, downward displacement of the lower wire guide device 6 may reliably be prevented. In order not to restrict movement of the lower wire guide device 6 in the direction of X1-axis, the linear motion bearing 36, linear motion bearing rail R3 and guide rail 37 are arranged in a compact manner underneath the workstand 8A cover K3, similar to the covers K1 and K2, protects the linear motion bearing 36 and linear motion bearing rail R3 against incursion of dielectric fluid.

Figure 9:
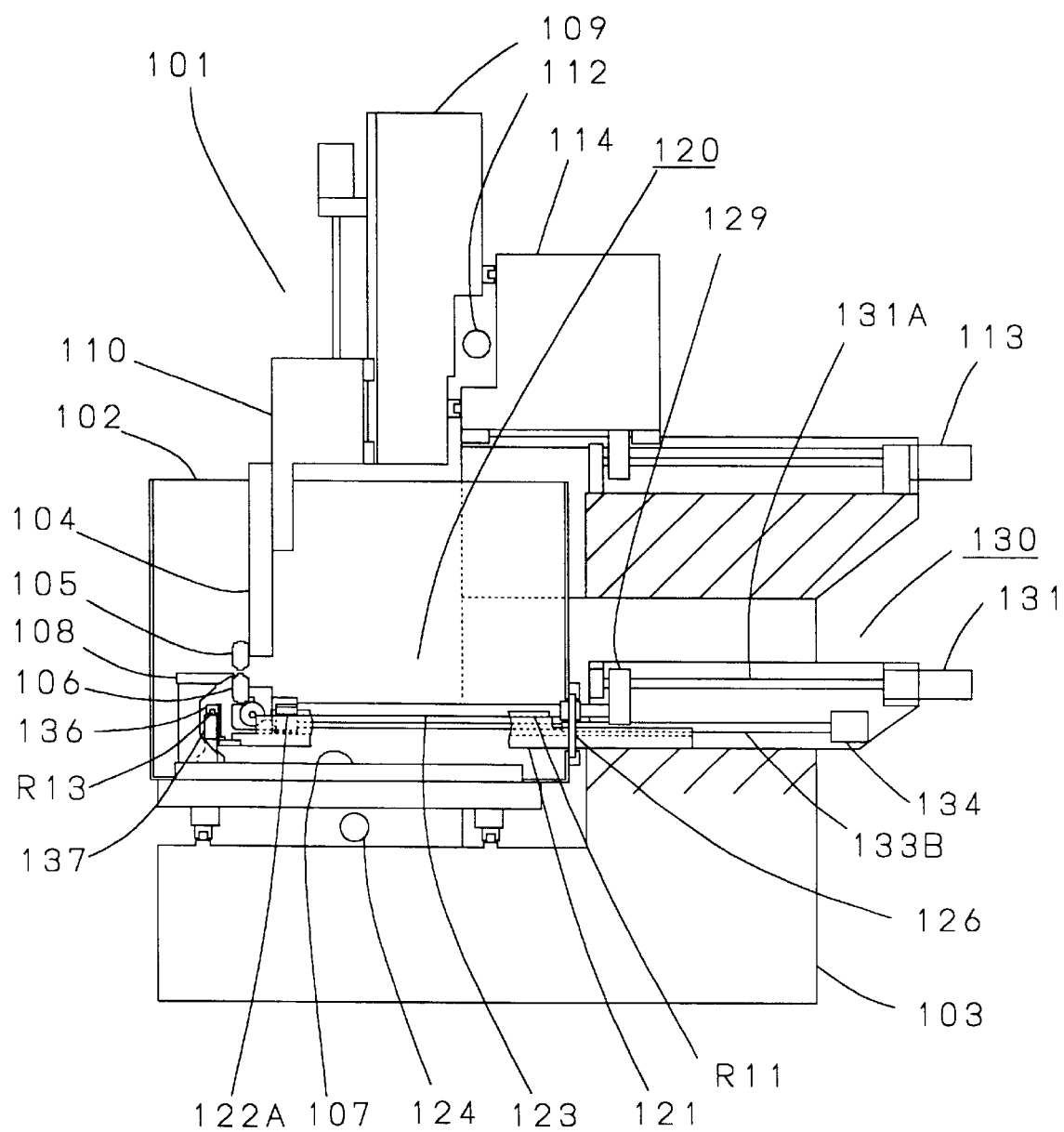
FIG. 9 is a side elevation illustrating a wire electric discharge machine according to a second embodiment of the present invention.

A wire electric discharge machine according to a second embodiment of the present invention will now be described with reference to FIG. 9. In FIG. 9, reference numerals in the "100 series" that are similar to the reference numerals used in FIG. 1 to FIG. 8 represent similar elements.

The wire electric discharge machine 101 is different from the wire electric discharge machine 1 of FIG. 1 in that the work tank 102 can be moved in the direction of the X-axis by the motor 124. Accordingly, the base end of the guide rail 121 is fixed at its bottom surface to a flat top surface of a bed 103. A lower wire guide drive unit 130 for moving the lower wire guide device 106 in the direction of the Y1-axis is also fixed to the bed 103. A motor 112 is provided for moving an upper wire guide device 105 in the direction of a U-axis. The U-axis is parallel to the X-axis, and when performing a straight cut there is no movement in the direction of the U axis.

Figure 10:
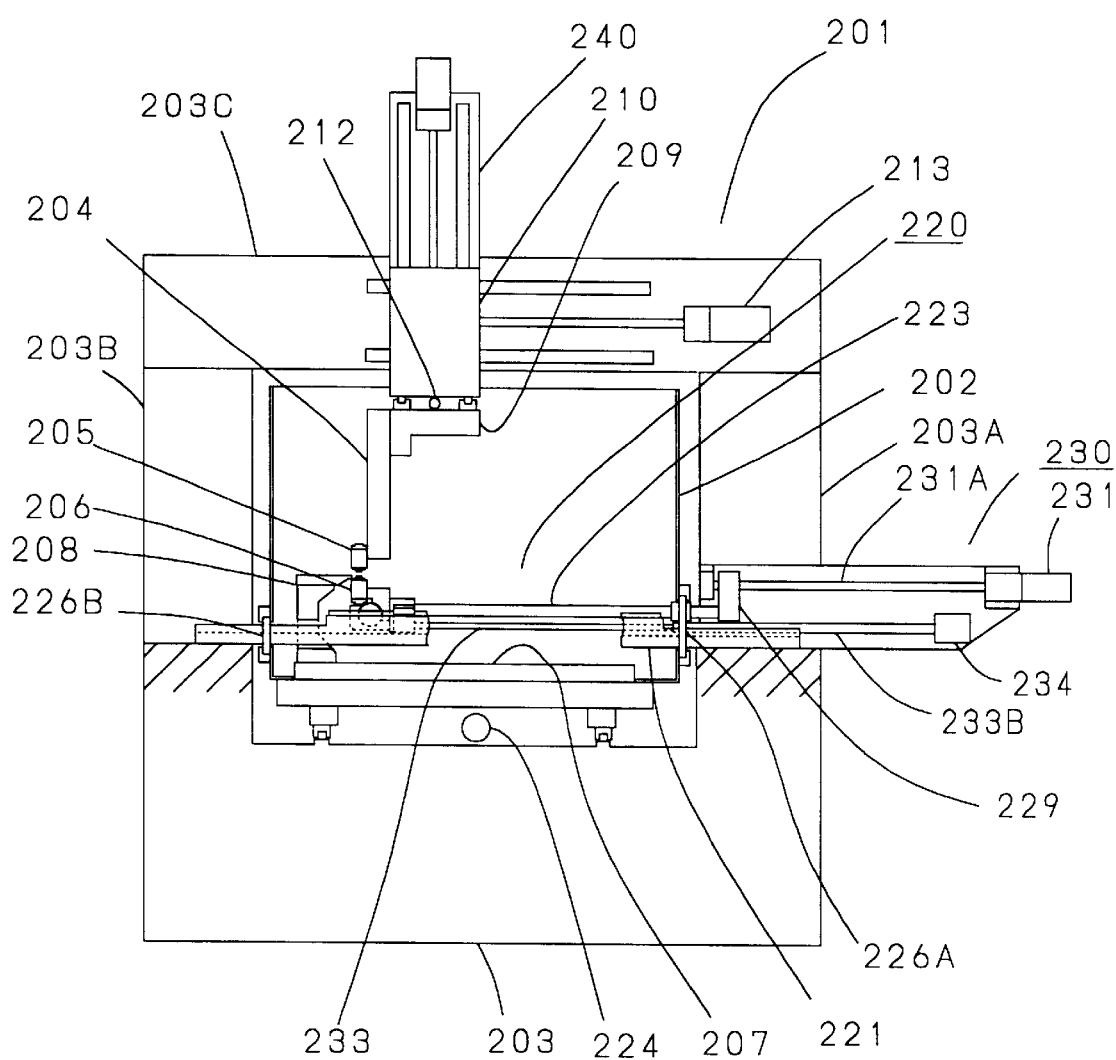
FIG. 10 is a side elevation illustrating a wire electric discharge machine according to a third embodiment of the present invention.

A wire electric discharge machine according to a third embodiment of the present invention will now be described with reference to FIG. 10. In FIG. 10, reference numerals in the "200 series" that are similar to the reference numerals used in FIG. 1 to FIG. 8 represent similar elements.

A work tank 202 of a portal wire electric discharge machine 201 is moveable between a column 203A and a column 203B in the direction of the X-axis by a motor 224. Similarly to the wire electric discharge machine 101 of FIG. 9, a lower wire guide drive unit 230 for moving the lower wire guide device 206 in the direction of the Y1-axis is fixed to a bed 203. A base end of the guide rail 221 has its bottom surface fixed to a flat top surface of the bed 203, and extends inside the work tank 202 through a slide plate 226A. The guide rail 221 also extends around the work stand 208 and a slide plate 226B to the outside of the work tank 202, and a tip end of the guide rail 221 is fixed to the bed 203. In this way, deformation of the guide rail 221 can be reliably prevented because it is supported at both ends. Top surfaces of the columns 203A and 203B are connected together by a beam 203C. A saddle 240 is provided on the beam 203C so as to be movable in the direction of the Y2-axis by a motor 213. A head 210 is attached to a saddle 240 so as to be movable in the direction of the Z-axis. A moving body 209 is attached to the head 210 so as to be movable in the U axis direction by a motor 212. An upper wire guide device 205 is attached to the moving body 209 using an upper arm 204. Although not shown in the drawing, a dielectric fluid supply tank and a power supply and NC unit are normally provided with the wire electric discharge machine 201. If the dielectric fluid supply tank and power supply and NC unit are arranged close to the right of the wire electric discharge machine 201, in front of and behind a lower wire guide drive unit 230 jutting out to the right from a machine frame, the lower wire guide drive unit 230 does not occupy a large area Since the work tank 202 does not move right and left in the direction of the Y-axis, the area occupied by the wire electric discharge machine 201 is made small.

The foregoing description of preferred embodiments of the invention has been presented for purposes of illustration and description. It is not intended to be exhaustive or to limit the invention to the precise form enclosed and obviously many modifications and variations are possible in light of the above teachings. It is intended that the scope of the invention be defined by the claims appended hereto.

What is claimed is:

1. A wire cut electric discharge machining apparatus for machining a workpiece using a wire electrode traveling vertically between upper and lower wire guide devices comprising:

a work tank, in said lower wire guide device and the workpiece being disposed in said work tank;

a lower wire guide drive unit for driving the lower wire guide device horizontally in a direction of a first axis disposed outside the work tank;

a connecting shaft connecting the lower wire guide device and the lower wire guide drive unit;

a first guide rail, extending from the outside of the work tank to inside of the work tank in the direction of the first axis, said first guide rail being movable relative to the work tank in the direction of a second axis which is perpendicular to the first axis; and a moveable support provided on the first guide rail for movably supporting the lower wire guide device.

2. The wire cut electric discharge machining apparatus according to claim 1, wherein the moveable support includes a pair of linear motion bearing rails provided on the upper surface of the first guide rail, and said linear motion bearing rails extending in the direction of the first axis, and a pair of linear motion bearings engaging the pair of linear motion bearing rails for movably supporting the lower wire guide device.

3. The wire cut electric discharge machining apparatus according to claim 1, wherein the lower wire guide drive unit includes a ball screw, a motor for rotating the ball screw, and a connecting member threadingly engaging the ball screw to which one end of the connecting shaft is fixed.

4. The wire cut electric discharge machining apparatus according to claim 1, further comprising a saddle movable in the direction of the second axis wherein a base end of the first guide rail is attached to a flat top face of the saddle.

5. The wire cut electric discharge machining apparatus according to claim 1, further comprising a second guide rail extending in the direction of the second axis, a linear motion bearing rail provided on an upper surface of the second guide rail, and a linear motion bearing engaging the linear motion bearing rail for supporting a tip end of the first guide rail.

6. The wire cut electric discharge machining apparatus according to claim 2, wherein said first guide rail has a generally U-shaped cross section.

7. The wire cut electric discharge machining apparatus according to claim 6, further comprising a connecting block suspended from the linear motion bearings for supporting said lower wire guide device on said connecting shaft.

8. The wire cut electric discharge machining apparatus according to claim 7, wherein said, generally U-shaped, first guide rail includes a recess and said connecting block and said connecting shaft are positioned generally in said recess.

9. The wire cut electric discharge machining apparatus according to claim 2, wherein a machining fluid is used during machining and further comprising a pair of covers for respectively sealing the ends of the linear motion bearing rails and the linear motion bearings from said machining fluid.

10. The wire cut electric discharge machining apparatus according to claim 9, wherein the space enclosed by said covers is pressurized.

11. The wire cut electric discharge machining apparatus according to claim 7, wherein said work tank has an elongated hole through which said guide rail passes and further comprising a slide plate disposal over said elongated hole, said slide plate having openings through which said guide rail and connecting shaft are adapted to pass.

12. The wire cut electric discharge machining apparatus according to claim 11, further comprising a bed and a moveable saddle member supported on said bed, said guide rail being attached to said saddle, and a sealing member in the slide plate through which said connecting shaft passes.

13. The electric discharge machining apparatus according to claim 12, wherein the lower wire guide drive unit includes a ball screw and a connecting member which threadingly engages the ball screw, said connection shaft being fixed at one end to the connecting block and at its other end to said connecting member.

* * * * *